US009672815B2

(12) United States Patent
Ganapathiraju et al.

(10) Patent No.: US 9,672,815 B2
(45) Date of Patent: Jun. 6, 2017

(54) METHOD AND SYSTEM FOR REAL-TIME KEYWORD SPOTTING FOR SPEECH ANALYTICS

(75) Inventors: Aravind Ganapathiraju, Hyderabad (IN); Ananth Nagaraja Iyer, Carmel, IN (US)

(73) Assignee: Interactive Intelligence Group, Inc., Indianapolis, IN (US)

(*) Notice: Subject to any disclaimer, the term of this patent is extended or adjusted under 35 U.S.C. 154(b) by 147 days.

(21) Appl. No.: 13/554,937

(22) Filed: Jul. 20, 2012

(65) Prior Publication Data
US 2014/0025379 A1 Jan. 23, 2014

(51) Int. Cl.
*G10L 15/04* (2013.01)
*G10L 15/08* (2006.01)
*G10L 15/14* (2006.01)

(52) U.S. Cl.
CPC ............ *G10L 15/08* (2013.01); *G10L 15/142* (2013.01); *G10L 2015/088* (2013.01)

(58) Field of Classification Search
CPC ......... G10L 15/04; G10L 15/05; G10L 15/06; G10L 17/04; G10L 17/16
See application file for complete search history.

(56) References Cited

U.S. PATENT DOCUMENTS

| 5,036,539 | A  | * | 7/1991  | Wrench et al. ............... 704/246 |
| 5,199,077 | A  |   | 3/1993  | Wilcox et al.                        |
| 5,749,069 | A  | * | 5/1998  | Komori et al. ............... 704/240 |
| 5,797,123 | A  |   | 8/1998  | Chou et al.                          |
| 6,073,095 | A  |   | 6/2000  | Dharanipragada et al.                |
| 6,138,095 | A  | * | 10/2000 | Gupta et al. .................. 704/234 |
| 6,434,520 | B1 | * | 8/2002  | Kanevsky et al. ............ 704/243  |
| 6,460,017 | B1 | * | 10/2002 | Bub et al. ..................... 704/256 |
| 7,437,290 | B2 | * | 10/2008 | Danieli ........................ 704/251 |
| 7,912,699 | B1 | * | 3/2011  | Saraclar et al. ................ 704/9 |
| 2002/0135618 | A1 | * | 9/2002 | Maes et al. ................... 345/767 |
| 2003/0009333 | A1 | * | 1/2003 | Sharma et al. ............... 704/246 |
| 2003/0191625 | A1 | * | 10/2003 | Gorin et al. ...................... 704/1 |
| 2006/0149558 | A1 | * | 7/2006 | Kahn et al. ................... 704/278 |
| 2007/0219793 | A1 | * | 9/2007 | Acero et al. .................. 704/240 |
| 2008/0071553 | A1 | * | 3/2008 | Hamadi et al. .................. 705/1 |
| 2010/0312550 | A1 |   | 12/2010 | Lee                                  |

(Continued)

OTHER PUBLICATIONS

International Search Report issued May 21, 2013 in PCT/US2012/047715, International Filing date Jul. 20, 2012, Related to U.S. Appl. No. 13/554,937, filed Jul. 20, 2012.

(Continued)

*Primary Examiner* — Michael N Opsasnick
(74) *Attorney, Agent, or Firm* — Ice Miller LLP

(57) ABSTRACT

A system and method are presented for real-time speech analytics in the speech analytics field. Real time audio is fed along with a keyword model, into a recognition engine. The recognition engine computes the probability of the audio stream data matching keywords in the keyword model. The probability is compared to a threshold where the system determines if the probability is indicative of whether or not the keyword has been spotted. Empirical metrics are computed and any false alarms are identified and rejected. The keyword may be reported as found when it is deemed not to be a false alarm and passes the threshold for detection.

26 Claims, 8 Drawing Sheets

(56) References Cited

U.S. PATENT DOCUMENTS

2011/0208521 A1  8/2011  McClain

OTHER PUBLICATIONS

James, D.A. and Young, S.J., "A fast lattice-based approach to vocabulary independent wordspotting", IEEE International Conference on Acoustics, Speech, and Signal Processing, ICASSP-94, Apr. 1994, pp. 377-380.
Amir A., Ehat A., and Srinivasan S. (2001), "Advances in Phonetic Word Spotting", In Proceedings of the Tenth International Conference on Information and Knowledge Management, pp. 580-582.
Wallace, Roy G., Vogt, Robert J., and Sridharan Sridha (2007) "A Phonetic Search Approach to the 2006 NIST Spoken Term Detection Evaluation". Proceedings Interspeech 2007: 8th Annual Conference of the INternational Speech Communication Association, pp. 2385-2388, Antwerp, Belgium.
Speech Recognition Grammar Specification Version 1.0, http://www.w3.org/TR/speech-grammar/.
Szoke I., et al., (2005): "Comparison of keyword spotting approaches for informal continuous speech", Interspeech-2005, 633-636.
Silaghi, M.C., and H. Bourlard (1999), "Iterative posterior-based keyword spotting without filler models". In Proceedings of IEEE Automatic Speech Recognition and Understanding Workshop, Keystone, Colorado (U.S.), pp. 1-16.
Sukkar, R.A., and J.G. Wilpon, "A two pass classifier for utterance rejection in keyword spotting", International Conference on Acoustic, Speech and Signal processing, ICASSP-93, Apr. 1993, pp. 451-454.
First Examination Report issued Feb. 9, 2016 in related New Zealand Application 704832 International Filing date Jul. 20, 2012, Related to U.S. Appl. No. 13/554,937, filed Jul. 20, 2012.
Supplemental European Search Report issued Nov. 18, 2015 in EP 12 88 1416 International Filing date Jul. 20, 2012, Related to U.S. Appl. No. 13/554,937, filed Jul. 20, 2012.
Keshet, J., et al: "Discriminative Keyword Spotting", Speech Communication, Elsevier Science Publishers, Amsterdamn, NL, vol. 51, No. 4, Apr. 1, 2009, pp. 317-329, XP025936888, ISSN: 0167-6393.
Second Examination Report issued Jun. 16, 2016 in related New Zealand Application 704832 International Filing date Jul. 20, 2012, Related to U.S. Appl. No. 13/554,937, filed Jul. 20, 2012.
First Examination Report issued Jul. 25, 2016 in related New Zealand Application 719961 International Filing date Jul. 20, 2012, Related to New Zealand Application 704832. Related to U.S. Appl. No. 13/554,937, filed Jul. 20, 2012.
Keshet J. et al: "Discriminative Keyword Spotting", Speech Communication, Science Publishers, Amsterdam, NL, vol. 51, No. 4, Apr. 1, 2009, pp. 317-329.

\* cited by examiner

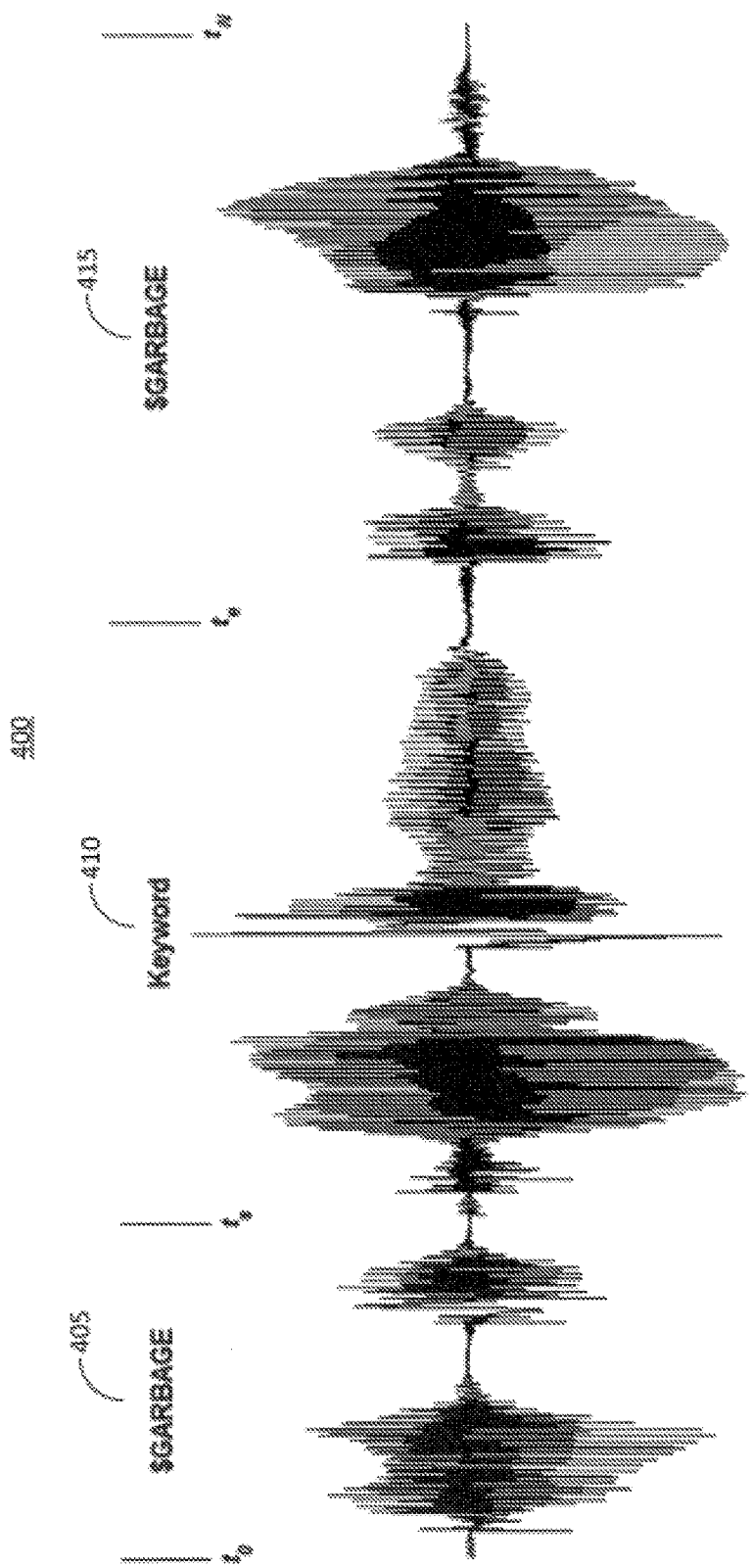

| Spoken word | d | ih | s | eh | M | b | er |
|---|---|---|---|---|---|---|---|
| December | -0.37 | -0.18 | -1.17 | -0.01 | -0.001 | -0.007 | -0.002 |
| Discover | -1.18 | -1.04 | -4.2 | -1.3 | -0.22 | -0.06 | -0.02 |

Fig. 5

METHOD AND SYSTEM FOR REAL-TIME KEYWORD SPOTTING FOR SPEECH ANALYTICS

BACKGROUND

The present invention generally relates to telecommunication systems and methods, as well as automatic speech recognition systems. More particularly, the present invention pertains to keyword spotting within automatic speech recognition systems.

Keyword spotting systems that are currently in use may include: phonetic search, garbage models, and large vocabulary continuous speech recognition (LVCSR). Each of these systems has inherent drawbacks which affect the accuracy and performance of the system.

In phonetic search systems, a "phonetic decoder" is relied upon which converts an audio stream into one or many possible sequences of phonemes which can be used to identify words. "John says", for example, can be broken down into the phoneme string "jh aa n s eh s". The phonetic decoder hypothesizes a phoneme stream for the audio. This phoneme sequence is compared to the expected phoneme sequence for a keyword and a match is found. Some systems developed with this concept have shown reasonable performance, however, there are many disadvantages for use in a real-time application. Use of a phonetic decoder prior to keyword search clearly needs to be done in two stages. This adds considerable complexity. Such a system would work well in retrieval from stored audio, where real-time processing is not required. Another disadvantage is the rate of error with phoneme recognition. The state-of-the-art speech recognizers, which incorporate complex language models, still produce accuracies in the range of 70-80%. The accuracy decreases further for conversational speech. These errors are further compounded by the phonetic search errors producing degradation in keyword spotting accuracy.

Another common technique used for keyword spotting is via the use of Garbage models that match to audio any data other than the keyword. A phoneme network is commonly used to decode non-keyword audio into a sequence of phonemes. One simple approach to implement this method is to use speech recognizers conforming to the Speech Recognition Grammar Specification (SRGS) and write a grammar as follows:

$root=$GARBAGE("keyword1"|"keyword2")$GARBAGE;

Since most speech recognizers use phonetic decoding to implement a $GARBAGE rule, these methods have the same disadvantages of the phonetic search, especially from a resource usage standpoint. Another approach to implementation of a garbage model is to treat it as a logical hidden Markov model (HMM) state, and its emitting probability to be a function of all triphone models in the acoustic model, or estimate it iteratively. Both the approaches hinder real-time requirements as they need computation of a large number of probabilities or go through the data in multiple passes.

LVCSR systems rely completely on a LVCSR speech recognition engine to provide a word-level transcription of the audio and later perform a text based search on the transcriptions for the keyword. Considering the high computational cost of LVCSR engines, this solution is clearly infeasible for real-time keyword spotting. Furthermore, the accuracy of LVCSR systems is usually tied closely with domain knowledge. The system's vocabulary needs to either be rich enough to contain all possible keywords of interest or be very domain specific. Spotting keywords from multiple languages would mean running multiple recognizers in parallel. A more effective means to increase the efficacy of these methods is desired to make keyword spotters more pervasive in real-time speech analytics systems.

SUMMARY

A system and method are presented for real-time speech analytics in the speech analytics field. Real time audio is fed along with a keyword model, into a recognition engine. The recognition engine computes the probability of the audio stream data matching keywords in the keyword model. The probability is compared to a threshold where the system determines if the probability is indicative of whether or not the keyword has been spotted. Empirical metrics are computed and any false alarms are identified and rejected. The keyword may be reported as found when it is deemed not to be a false alarm and passes the threshold for detection.

In one embodiment, a computer-implemented method for spotting predetermined keywords in an audio stream is disclosed, comprising the steps of: a) developing a keyword model for the predetermined keywords; b) comparing the keyword model and the audio stream to spot probable ones of the predetermined keywords; c) computing a probability that a portion of the audio stream matches one of the predetermined keywords from the keyword model; d) comparing the computed probability to a predetermined threshold; e) declaring a potential spotted word if the computed probability is greater than the predetermined threshold; f) computing further data to aid in determination of mismatches; g) using the further data to determine if the potential spotted word is a false alarm; and h) reporting spotted keyword if a false alarm is not identified at step (g).

In another embodiment, a computer-implemented method for spotting predetermined keywords in an audio stream is disclosed, comprising the steps of: a) developing a keyword model for the predetermined keywords; b) dividing the audio stream into a series of points in an acoustic space that spans all possible sounds created in a particular language; c) computing a posterior probability that a first trajectory of each keyword model for the predetermined keywords in the acoustic space matches a second trajectory of a portion of the series of points in the acoustic space; d) comparing the posterior probability to a predetermined threshold; and e) reporting a spotted keyword if the posterior probability is greater than the predetermined threshold.

In another embodiment, a system for spotting predetermined keywords in an audio stream is disclosed, comprising: means for developing a keyword model for the predetermined keywords; means for comparing the keyword model and the audio stream to spot probable ones of the predetermined keywords; means for computing a probability that a portion of the audio stream matches one of the predetermined keywords from the keyword model; means for comparing the computed probability to a predetermined threshold; means declaring a potential spotted word if the computed probability is greater than the predetermined threshold; means for computing further data to aid in determination of mismatches; means for using the further data to determine if the potential spotted word is a false alarm; and means for reporting spotted keyword if a false alarm is not identified.

BRIEF DESCRIPTION OF THE DRAWINGS

FIG. 4 is a diagram illustrating a speech signal showing a spoken keyword surrounded by garbage models.

FIG. 5 is a table illustrating phoneme level probabilities.

DETAILED DESCRIPTION

Figure 1:
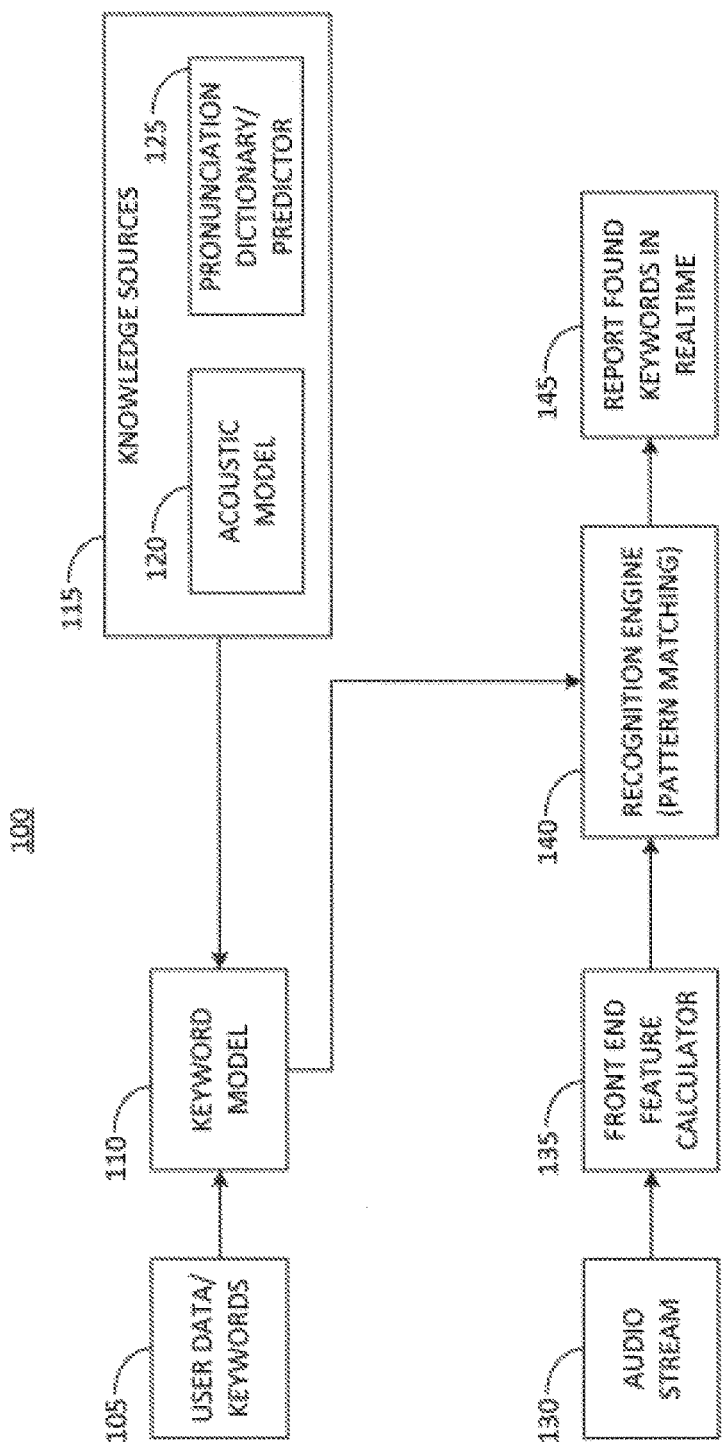
FIG. 1 is a diagram illustrating the basic components in a keyword spotter.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Automatic speech recognition (ASR) systems analyze human speech and translate them into text or words. Performance of these systems is commonly evaluated based on the accuracy, reliability, language support, and the speed with which speech can be recognized. The performance of the system is expected to be very high. Superior performance is often quantified by a high detection rate and a low false alarm rate. Industry standard is considered to be around a 70% detection rate at 5 false alarms per keyword per hour of speech, or 5 FA/kw/hr. Factors such as accent, articulation, speech rate, pronunciation, background noise, etc., can have a negative effect on the accuracy of the system. Processing speed is necessary to analyze several hundreds of telephone conversations at once and in real-time. The system is also expected to perform consistently and reliably irrespective of channel conditions and various artifacts introduced by modern telephony channels, especially voice over IP. Keywords from multiple languages also need to be spotted on the same audio source.

Those skilled in the art will recognize from the present disclosure that the various methodologies disclosed herein may be computer implemented using a great many different forms of data processing equipment, such as digital microprocessors and associated memory executing appropriate software program(s), to name just one non-limiting example. The specific form of the hardware, firmware and software used to implement the presently disclosed embodiments is not critical to the present invention.

In the present invention, posterior probability computations for speech recognition systems may be used to increase system effectiveness. Prior systems designed to perform keyword spotting use the log-likelihood measure to match presented audio to the phonemes in a keyword. Phonemes are sub-word units that typically are modeled in ASR systems. Additionally, phonemes can be modeled in isolation or in context of other phonemes. The former are called monophones and the latter are called triphones when the phoneme depends on its previous and next phonemic context. Posterior probability, as used in this invention, may be a measure of how well the audio matches to a model when compared to the same audio as it is matched to all other models for a given speech pattern.

Use of posterior probabilities in speech recognition has been attempted in the past, primarily by training a neural network. While this method returns an approximation to the posterior probability, it tends to be extremely computationally expensive and requires special training procedures.

An alternative approach to posterior probability computation for speech recognition may be developed as follows:

By definition, posterior probability (P) of a model ($T_i$), given an observation vector x, may be written as:

$$P(T_i \mid x) = \frac{P(x \mid T_i) P(T_i)}{\sum_j P(x \mid T_j) P(T_j)}$$

where $P(x \mid T_i)$ is the probability of model $T_i$ generating the acoustics x and j is a variable that spans the indices of all models. In the above equation, the term $P(T_i)$ is held constant for all models, and the formula can be re-written as:

$$P(T_i \mid x) = \frac{P(x \mid T_i)}{\sum_j P(x \mid T_j)}$$

This equation is still prohibitively expensive to calculate. The expense may be attributed to the fact that the denominator term is a summation of all models, which can be very large for a context dependent triphone based system (typically tens of thousands of models). To study the impact of the denominator terms, an intuitive and graphical approach may be taken. The denominator as a whole signifies the total probability of models spanning the entire audio space. Therefore, the above equation can be rewritten as:

$$P(T_i \mid x) = \frac{P(x \mid T_i)}{\sum \mathcal{M} : \forall \mathcal{M} \in \mathbb{M}}$$

where M represents a model, $\forall M$ represents all of the models in the entire audio space, represented as $\mathbb{M}$.

The above formula does not lose generality. The denominator term is now a summation over any set of models that completely spans the audio feature space.

FIG. 1 is a diagram illustrating the basic components in a keyword spotter, 100. The basic components of a keyword spotter 100 may include User Data/Keywords 105, Keyword Model 110, Knowledge Sources 115 which include an Acoustic Model 120 and a Pronunciation Dictionary/Predictor 125, an Audio Stream 130, a Front End Feature Calculator 135, a Recognition Engine (Pattern Matching) 140, and the Reporting of Found Keywords in Real-Time 145.

Keywords may be defined, 105, by the user of the system according to user preference. The keyword model 110 may be formed by concatenating phoneme HMMs. This is further described in the description of FIG. 2. The Keyword Model, 110, may be composed based on the keywords that are defined by the user and the input to the keyword model based on Knowledge Sources, 115. Such knowledge sources may include an Acoustic Model, 120, and a Pronunciation Dictionary/Predictor, 125.

The Knowledge Sources 115 may store probabilistic models of relations between pronunciations and acoustic events. The Knowledge Sources 115 may be developed by analyzing large quantities of audio data. The acoustic model and the pronunciation dictionary/predictor are made, for example, by looking at a word like "hello" and examining the phonemes that comprise the word. Every keyword in the system is represented by a statistical model of its constituent sub-word units called the phonemes. The phonemes for "hello" as defined in a standard phoneme dictionary are: "hh", "eh", "l", and "ow". Models of the four phonemes are then strung together into one composite model which then becomes the keyword model for the world "hello". These models are language dependent. In order to also provide multi-lingual support, multiple knowledge sources may be provided.

The acoustic model 120 may be formed by statistically modeling the various sounds that occur in a particular language. A phoneme is assumed to be the basic unit of sound. A predefined set of such phonemes is assumed to completely describe all sounds of a particular language. An HMM; which encodes the relationship of the observed audio signal and the unobserved phonemes, forms the fundamental theory for most modern speech recognition systems. A phoneme is considered to be composed of three states, representing the beginning, central, and trailing portions of the sound. An HMM is constructed by concatenating these three states. A training process studies the statistical properties of each of these states for all of the phonemes over a large collection of transcribed audio. A relation between the textual properties and the spoken properties is thus formed. Typically, the statistics of states may be encoded using a Gaussian mixture model (GMM). A set of these GMMs is termed as an acoustic model. Specifically, the one described in this application is referred to as a context-independent, or monophone, model. Many other model types may also be used. For example, many modern speech recognition systems may utilize a more advanced acoustic model, which may be context-dependent and capture the complex variations created due to the position of phonemes in conversational speech. Each state of a phoneme is specialized to its left and right neighboring phonemes. Clearly such a scheme would result in a very large number of GMMs in the acoustic model. One example of a context-dependent phoneme is a triphone.

The pronunciation dictionary, 125, in FIG. 1 may be responsible for decomposing a word into a sequence of phonemes. Keywords presented from the user may be in human readable form, such as grapheme/alphabets of a particular language. However, the pattern matching algorithm may rely on a sequence of phonemes which represent the pronunciation of the keyword. The present invention utilizes a pronunciation dictionary, which may store a mapping between commonly spoken words and their pronunciations. Once the sequence of phonemes is obtained, the corresponding statistical model for each of the phonemes in the acoustic model may be examined. A concatenation of these statistical models may be used to perform keyword spotting for the word of interest. For words that are not present in the dictionary, a predictor, which is based on linguistic rules, may be used to resolve the pronunciations.

The audio stream (i.e., what is spoken into the system by the user), 130, may be fed into the front end feature calculator, 135, which may convert the audio stream into a representation of the audio stream, or a sequence of spectral features. Audio analysis may be performed by segmenting the audio signal as a sequence of short (typically 10 ms) windows and extracting spectral domain features. For each window, the feature calculator may calculate a set of 13 Mel Frequency Cepstral Coefficients (MFCC) and their first and second order derivatives. The resulting calculations represent each of these windows as a point in a 39-dimensional space $M$. This space completely spans all possible sounds created in a particular language.

The keyword model, 110, which may be formed by concatenating phoneme hidden Markov models (HMMs), and the signal from the audio stream, 135, may both then be fed into a recognition engine for pattern matching, 140. The task of the recognition engine may be to take a set of keyword models and search through presented audio stream to find if the words were spoken. In the multi-dimensional space constructed by the feature calculator, a spoken word may become a sequence of MFCC vectors forming a trajectory in the acoustic space $M$. Keyword spotting may now simply become a problem of computing probability of generating the trajectory given the keyword model. This operation may be achieved by using the well-known principle of dynamic programming, specifically the Viterbi algorithm, which aligns the keyword model to the best segment of the audio signal, and results in a match score. If the match score is significant, the keyword spotting algorithm infers that the keyword was spoken and reports a keyword spotted event.

The resulting keywords may then be reported in real-time, 145. The report may be presented as a start and end time of the keyword in the audio stream with a confidence value that the keyword was found. The primary confidence value may be a function of how the keyword is spoken. For example, in the case of multiple pronunciations of a single word, the keyword "tomato" may be spoken as "te-mah-toh" and "te-may-toh". The primary confidence value may be lower when the word is spoken in a less common pronunciation or when the word is not well enunciated. The specific variant of the pronunciation that is part of a particular recognition is also displayed in the report.

Figure 2:
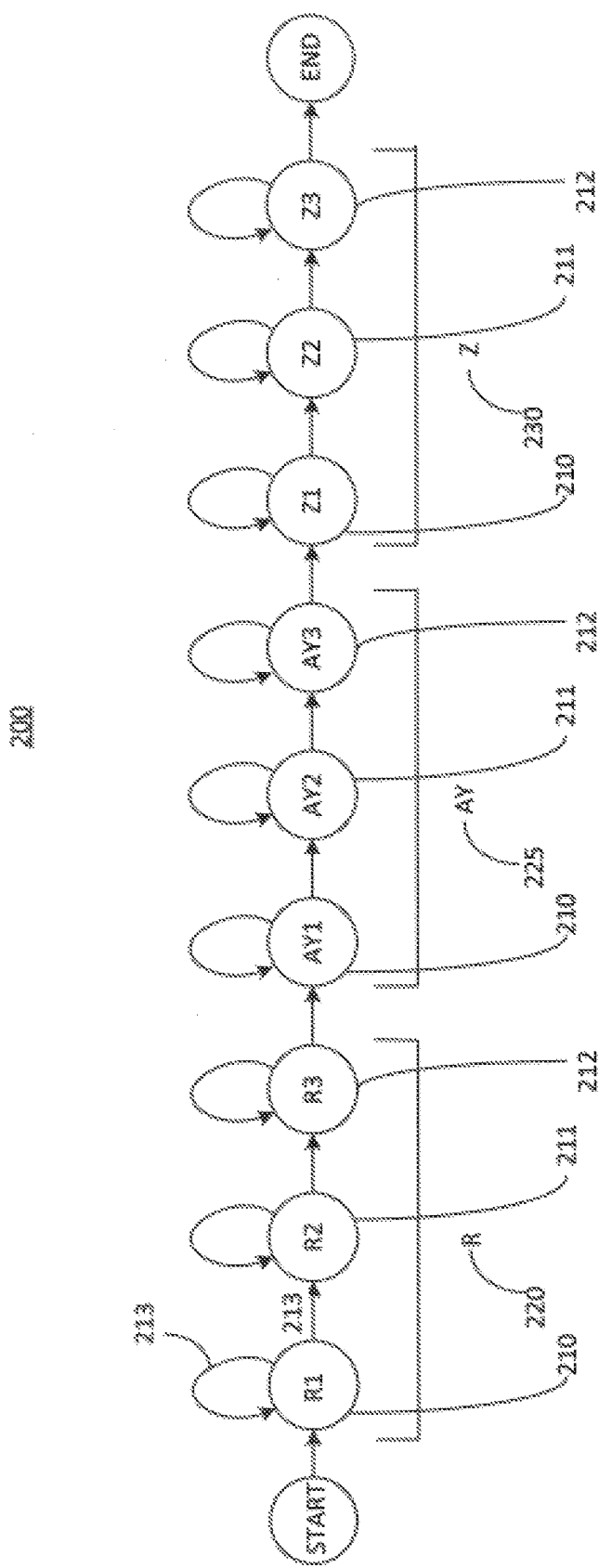
FIG. 2 is a diagram illustrating a concatenated HMM model.

FIG. 2 is a diagram illustrating a concatenated HMM model. A keyword model may be formed by concatenating phoneme HMMs. For example, the keyword model 200 for the word "rise" is constructed from the monophone models of the phonemes that comprise its pronunciation. The phonemes comprising the pronunciation of "rise" are "r", "ay", and "z". Each phoneme has three states present consisting of a beginning portion of sound 210, a central portion of sound 211, and trailing portion of sound 212. For example, the phoneme "r" has a beginning portion of sound 210 shown as "r1" in the model. The central portion of sound 211 is exhibited by "r2" and the trailing portion of sound 212 is exhibited by "r3". The phoneme "ay" has a beginning portion of sound 210 illustrated as "ay1" in the model. The central portion of sound 211 is illustrated by "ay2" and the trailing portion of sound 212 is illustrated by "ay3". The phoneme "z" has a beginning portion of sound 210 illustrated as "z1" in the model. The central portion of sound 211 is exhibited by "z2" and the trailing portion of sound 212 is exhibited by "z3". Each portion of sound has a transition 213 either within the portion itself or between portions. In a similar fashion, a context dependent keyword model may be constructed by concatenating its triphone models.

Figure 3A:
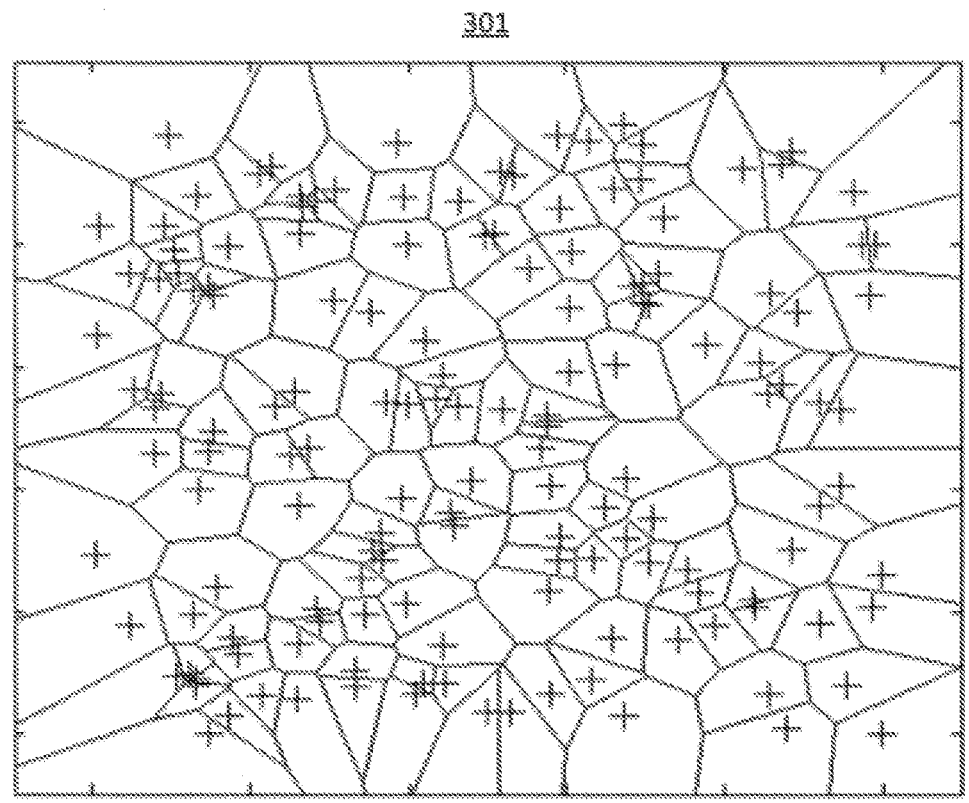
FIG. 3a is a diagram illustrating an abstract visualization of the audio feature space and the triphone models which span this space.
Figure 3B:
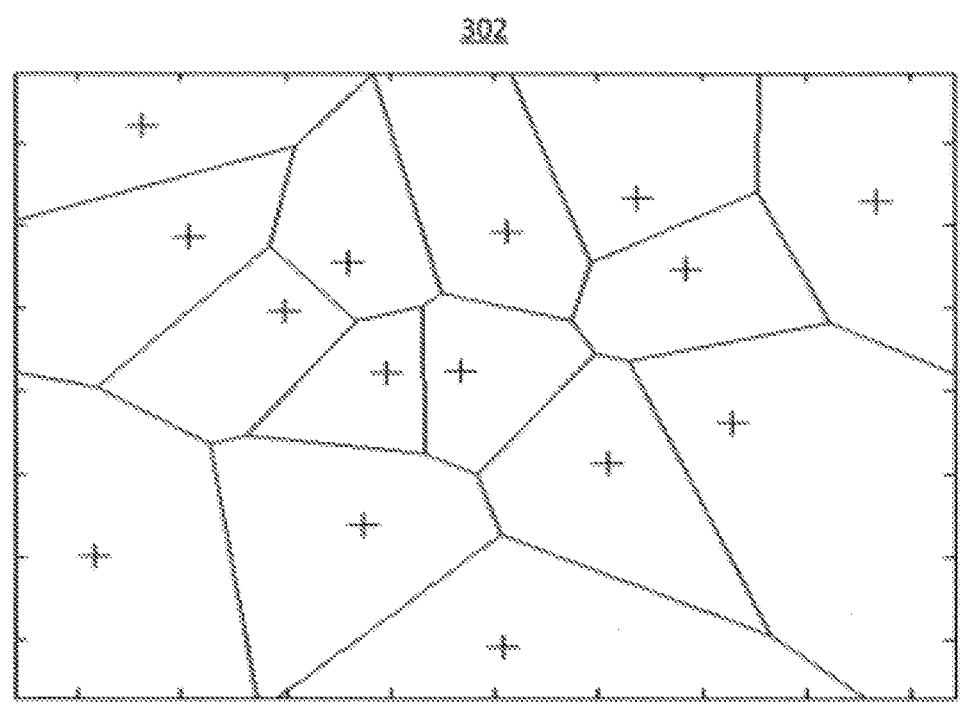
FIG. 3b is a diagram illustrating monophone models which completely span the same audio feature space.

FIG. 3a is a diagram illustrating an abstract visualization of the audio feature space and the triphone models which spans this space. In reality, the audio space is 39-dimensional, but for illustration purposes, a 2-dimensional space is shown. FIG. 3b is a diagram illustrating monophone models which completely span the same audio feature space. In light of the observations from FIGS. 3a and 3b, the keyword spotting algorithm as presented above $$P(T_i | x) = \frac{P(x | T_i)}{\sum \mathcal{M}: \forall \mathcal{M} \in \mathbb{M}}$$

becomes $$P(T_i | x) = \frac{P(x | T_i)}{\sum_k P(x | M_k)}$$

when $\mathbb{M}$ is assumed as the set of monophone models in the first equation, and where $M_k$ represents the monophone models in the second equation. $\forall \mathcal{M}$ is assumed as the set of monophone models. It will be appreciated from the present disclosure that $T_i$ and $M_k$ both span the entire audio space, M, completely. Since the number of GMMs present in the monophone model (FIG. 3b) is significantly smaller compared to the triphone model (FIG. 3a), computation of posterior probabilities is extremely fast, yet a close representation of the correct value.

FIG. 4 is a diagram illustrating a speech signal 400 showing a spoken keyword 410 surrounded by garbage models 405, 415. A keyword is spoken as a part of a continuous speech stream. In the segment of audio between $t_o$ and $t_s$, the garbage model 405 takes precedence, as it matches non-keyword audio portions. The accumulated score during this period is represented by $S_1$ in the following equations. Similarly, in the audio segment $t_e$ to $t_N$, the garbage match score is represented by $S_2$. Here, the garbage model 415 takes precedence. Instead of explicitly computing the garbage probabilities, $S_1$ and $S_2$, a constant value e is chosen such that $$e(T_s - T_0) = S_1,$$

and $$e(T_N - T_e) = S_2.$$

The constant e is validated on a large test dataset to realize no significant reduction in performance when compared to explicitly computing the garbage probability. This approximation of using a constant garbage value makes the system significantly faster as compared to traditional keyword spotting algorithms.

FIG. 5 is a table illustrating phoneme level probabilities 500 comparing the phoneme match probabilities of the spoken words "December" and "discover" as compared to the keyword model for "December". A high rate of false alarms may be counted as one of the main problems in a keyword spotting algorithm. Unlike LVCSR engines, keyword spotters have no access to word level contextual information. For example, when searching for the keyword "rise", the acoustic signal for "rise" is very similar to that of "price", "rice", "prize", "notarize", etc. These words would thus be treated as a match by the system. This is a similar problem as in substring searches in text where subwords match to the keystring.

In order to constrain false alarms, the following are a few non-limiting examples of approaches may be used as a secondary check on keyword matches found by the main Viterbi algorithm. Anti-words are a set of words that are commonly confused with keywords within the system. In the presented example with the words "price", "rice", "prize", "notarize", etc., as mentioned above, these words comprise the anti-word set of the keyword "rise". The system searches for these anti-words in parallel to the keyword and reports a keyword found event only when the keyword match score supersedes the anti-word match score. This feature is an effective method to curb spurious false alarms. The method, however, still requires user intervention and creating large anti-word sets. Other techniques may be purely data driven and thus sometimes more desirable.

Mismatch phoneme percentage determines the number of phonemes of the keyword that mismatch the audio signal, even though the overall keyword probability from the Viterbi search was found as a match. For example, the word "December" as shown in FIG. 5, may be found to wrongly match instances of "Discover" by the keyword spotter. Phoneme level probabilities are exemplified in FIG. 5. Score represents how much the phoneme matches the audio stream. Using the instant example, the more positive the number, the better the match. A score value of "0" would indicate a perfect match. These scores are always negative or zero. For the phoneme "d", the probability for "December" is −0.37, while it is −1.18 for "discover". It can be noted that all of the phonemes yield lower probabilities when the spoken utterance was "discover" as compared to the spoken utterance "December". This metric computes the percentage of such misfit phonemes and performs an additional check before reporting keyword found events.

Analogous to the mismatch phoneme percentage, the match phoneme percentage measure computes the percentage of phonemes that match the audio signal. The percentage of fit phonemes may be expected to be above a preset threshold for the keyword found event to be reported.

The duration penalized probability emphasizes durational mismatches of a keyword with the audio stream. For example, consonants such as "t", "d", and "b" have a lower expected duration compared to vowels such as "aa", "ae", and "uw". In the event these consonants match for a longer than expected duration, the keyword match is most likely a false alarm. These events can be the result of poor acoustic model or presence of noise in the signal being analyzed. To capture such a scenario, the duration penalized probability is computed as $$p_i = \begin{cases} 2p_i, & \text{if } d_i > D \\ p_i, & \text{if } d_i <= D \end{cases}$$

where $p_i$ represents the probability of phoneme i, $d_i$ represents the duration of phoneme i, and D represents a duration threshold determined based upon tests performed on large datasets. The duration penalized score for a keyword may be represented by the average of all its phoneme scores. By doubling the scores for long phonemes, this metric emphasizes mismatches created by spurious phonemes and thus lowering false alarms.

Figure 6:
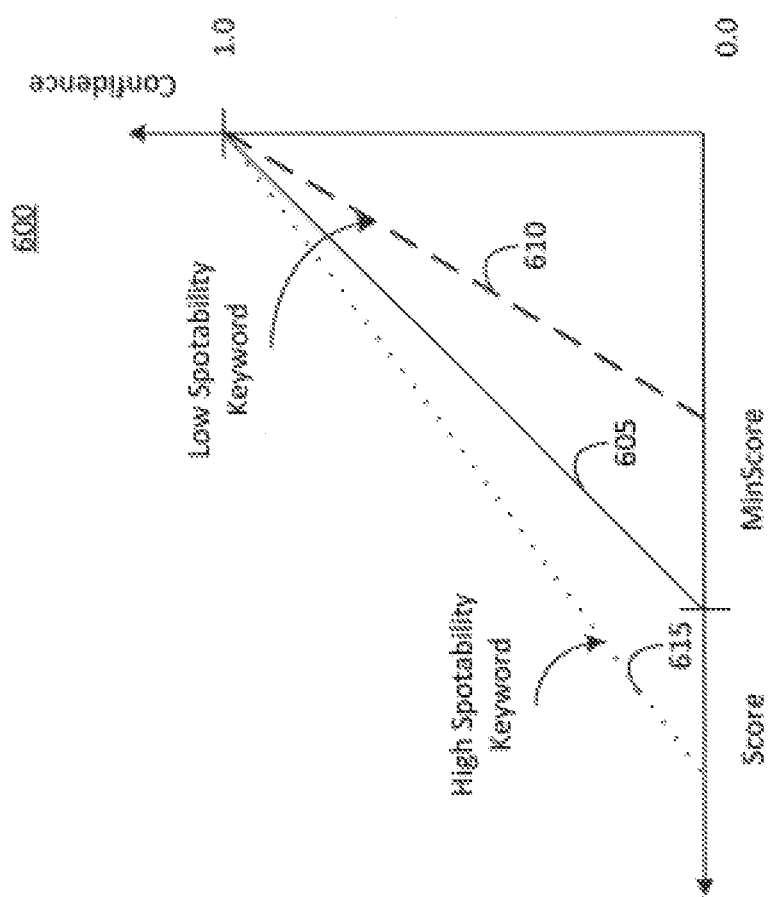
FIG. 6 is a diagram illustrating the relation between the internal match "Score" and external "Confidence" values.

FIG. 6 is a diagram illustrating the relation between the internal match "Score" and external "Confidence" values. Spotability is a measure of expected accuracy from the system. The primary use of this measure is to guide users in determining a good set of keywords. Other uses include feedback to the recognition engine and controlling the false alarm rate. The diagram in FIG. 6 shows the relationship between the match probability, or the "score", as determined by the recognition engine and the confidence values as reported by the system. By default, the solid curve 605 is used if no information about the keyword is known. If Spotability is known, the relationship may be modified by changing the operating score range of the keyword, as shown by the dashed and dotted lines. The dashed line 610 exhibits a low spotability keyword while the dotted line 615 exhibits a high spotability keyword. As the value of confidence increases, so does the likelihood of a match where 0.0 is indicative of no match and 1.0 is a match. As the minScore becomes more negative, so does the likelihood of a mismatch. As the Score approaches 0.0, there is a greater likelihood of a match. Thus, a Score of 0 and a Confidence of 1.0 would indicate a perfect match.

Figure 7:
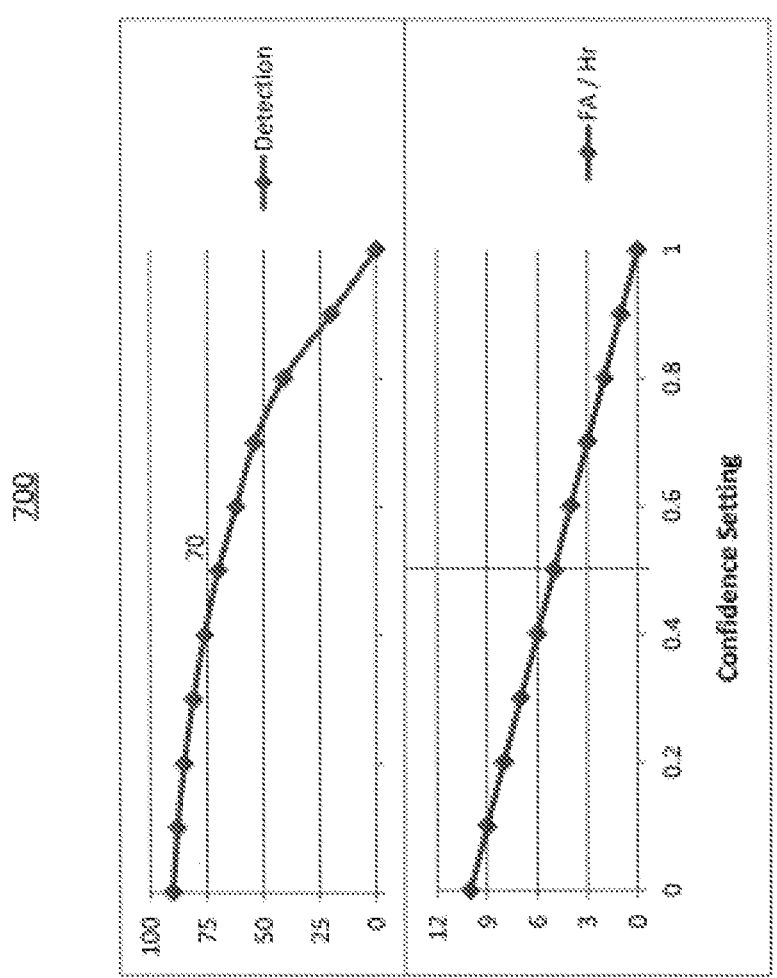
FIG. 7 is a diagram illustrating the system behavior with varied confidence settings.

FIG. 7 is a diagram illustrating the system behavior with varied confidence settings. The result of changing the operating range based on spotability is a more controlled behavior of the system. When a user registers a keyword to be spotted, an associated spotability measure is presented, such as 70. By definition, this means the system results in 70% accuracy with a false alarm rate of 5 per hour. To obtain this behavior from the system, the internal score range is modified as shown in FIG. 7, such that at the default confidence setting (0.5) the system produces 5 false alarms per hour and a detection rate of 70%. If the user wishes a higher accuracy, the confidence setting is lowered, which in turn could possibly create a higher false alarm rate. If the user wishes lower false alarm rate, confidence setting is increased, thus possibly resulting in lower detection rate.

The diagram 700 illustrates the behavior of the system as the confidence settings are altered. As the Confidence setting approaches 1.0, the rate of detection decreases until it achieves a value 0.0 at a Confidence setting of 1.0. The rate of false alarms also decreases and approaches 0.0 as the Confidence setting approaches 1.0. Conversely, as the rate of detection increases, the Confidence setting approaches 0.0 and the rate of False Alarms (FA/Hr) increases.

Figure 8:
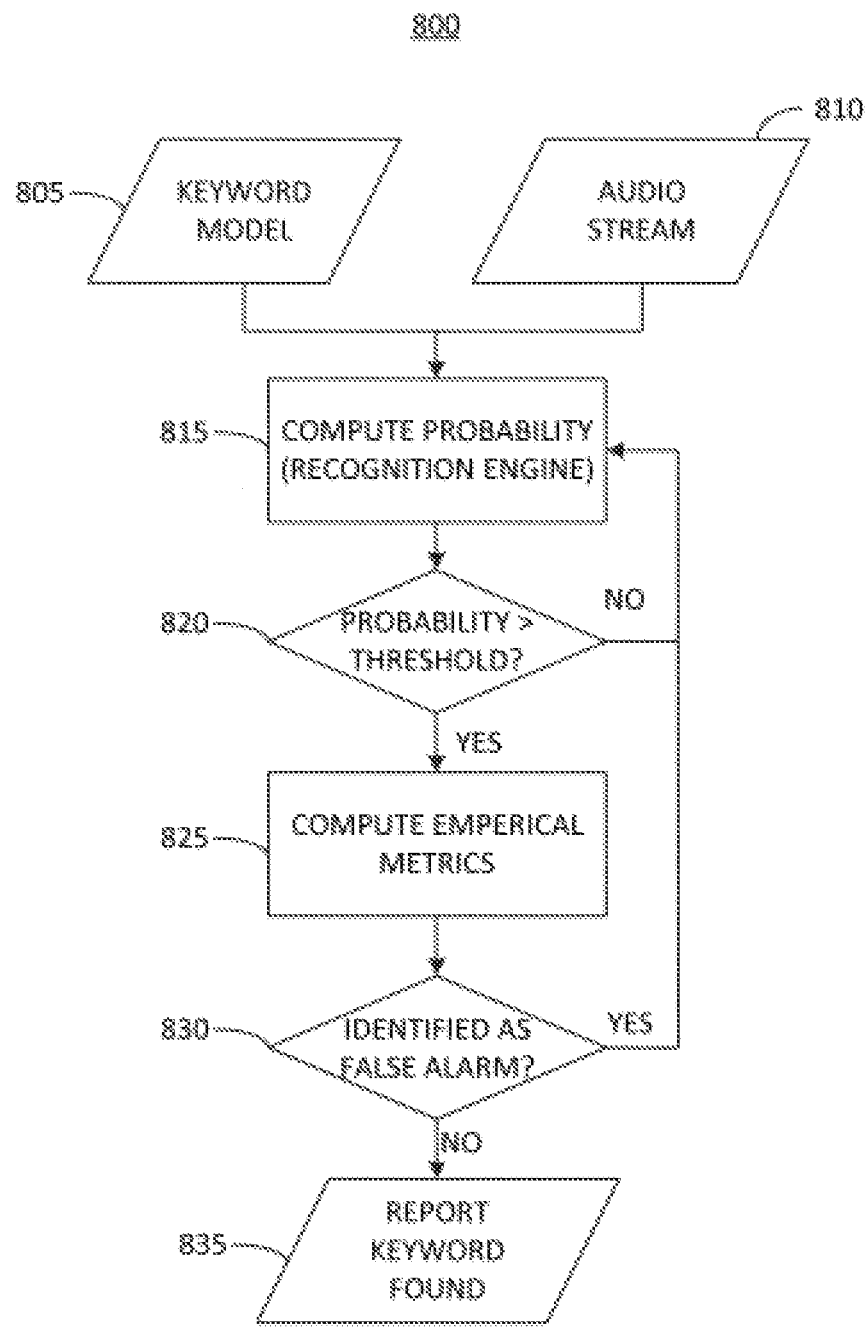
FIG. 8 is a flowchart illustrating the keyword spotting algorithm utilized in the system.

As illustrated in FIG. 8, a process 800 for utilizing the keyword spotting algorithm is provided. The process 800 may be operative on any or all elements of the system 100 (FIG. 1).

Data is contained within both the Keyword Model 805 and the Audio Stream 810. While the Keyword Model 805 may just be needed once during the data flow process, the Audio Stream 810 is a continuous input of data into the system. For example, the Audio Stream may be a person speaking into the system real-time via a digital telephone. The Keyword Model 805, which is formed by concatenating phoneme HMMs, contains the keywords that are user defined according to user preference. For example, a user may define keywords that are industry specific such as "terms", "conditions", "premium", and "endorsement" for the insurance industry. These keywords in the Keyword Model 810 are used for pattern matching with words that are continuously input into the system via the Audio Stream 810. Control is passed to operation 815 and the process 800 continues.

In operation 815, probability is computed in the Recognition Engine, 140 (FIG. 1). As previously described, probability scores are used by the system to determine matched phonemes. The percentage of these phonemes is expected to be above the preset threshold for the keyword found event to be report. Control is passed to operation 820 and the process 800 continues.

In operation 820, it is determined whether or not the computed probability is greater than the threshold. If it is determined that the probability is greater than the threshold, then control is passed to step 825 and process 800 continues. If it is determined that the probability is not greater than the threshold, then the system control is passed to step 815 and process 800 continues.

The determination in operation 820 may be made based on any suitable criteria. For example, the threshold may be user set or left at a system default value. As the value of the threshold, or confidence setting, approaches 0.0, the higher the frequency of false alarms which may occur. The rate of detection of the keyword may not be much higher than if the confidence setting was slightly higher with less frequency of false alarms.

In the event that control is passed back to step 815, probability is then computed again using a different piece of the audio stream and the process proceeds.

In operation 825, the system computes empirical metrics, such as comparison to anti-word scores, mismatch phoneme percentage, match phoneme percentage, and/or duration penalized probability, to name just a few non-limiting examples. The metrics are used to compute secondary data and may serve as an additional check before reporting keyword found events. Control is passed operation 830 and the process 800 continues.

In operation 830, it is determined whether or not the possible matches are identified as false alarms. If it is determined that the possible matches are false alarms, then control is passed to step 815 and process 800 continues. If it is determined that the possible matches are not false alarms, then control is passed to step 835 and process 800 continues.

Once the process returns to step 815, probability is computed again using a different piece of the audio stream and the process proceeds.

The determination in operation 830 may be made based on any suitable criteria. In some embodiments, the criteria are based on the probabilities and the empirical metrics that have been calculated by the system.

In operation 835, the system reports the keyword as found and the process ends.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computerized method for real-time spotting of predetermined keywords in an audio stream, in an automatic speech recognition system, wherein said system comprises at least a speech recognition engine, the method comprising the steps of:
   a) developing a keyword model for the predetermined keywords;
   b) comparing, in real-time, the keyword model and the audio stream to recognize candidates of the predetermined keywords in the audio stream;
   c) computing, by the speech recognition engine, a probability that a portion of the audio stream matches one of the predetermined keywords from the keyword model, wherein the probability is determined utilizing a posterior based probability approach which comprises analysis of monophone models over an audio feature space;

d) comparing the computed probability of a keyword match to a predetermined threshold and declaring a match if the computed probability meets the predetermined threshold;

e) computing further data to aid in determination of mismatches, wherein said further data comprises empirical metrics, and determining if the candidates are mismatches; and f) reporting spotted keywords if a mismatch is not identified at step (e), wherein the reporting comprises generating a report, via a microprocessor and software program, that is presented as a start and end time of the spotted keywords in the audio stream with the computed probability that the keywords were found.

2. The method of claim 1, wherein step (b) comprises:
b.1) converting the audio stream into a sequence of spectral features; and
b.2) comparing the keyword models to the sequence of spectral features.

3. The method of claim 2, wherein step (b.1) comprises:
b.1.1) converting the audio stream into a sequence of windows; and
b.1.2) calculating a set of 13 Mel Frequency Cepstrel Coefficients and their first and second order derivatives for each window.

4. The method of claim 1, wherein step (c) comprises executing a Viterbi algorithm.

5. The method of claim 1, wherein the posterior based probability approach comprises applying the mathematical equation:

$$P(T_i \mid x) = \frac{P(x \mid T_i)}{\sum_k P(x \mid M_k)}$$

where P represents a probability, $T_i$ represents a model, x represents the acoustics, and $M_k$ represents monophone models over an audio space.

6. The method of claim 1, wherein step (c) comprises:
c.1) assigning a constant predetermined probability to the portions of the audio stream that do not match the keyword.

7. The method of claim 1, wherein the audio stream comprises a continuous spoken speech stream.

8. The method of claim 1, wherein step (a) comprises concatenating phoneme hidden Markov models of predetermined keywords.

9. The method of claim 1, wherein step (a) comprises:
a.1) creating a pronunciation dictionary that defines a sequence of phonemes for each of the predetermined keywords;
a.2) creating an acoustic model that statistically models a relation between textual properties of the phonemes for each of the predetermined keywords and spoken properties of the phonemes for each of the predetermined keywords; and
a.3) concatenating acoustic models for the sequence of phonemes for each of the predetermined keywords.

10. The method of claim 9, wherein step (a.2) comprises creating a set of Gaussian mixture models.

11. The method of claim 9, wherein step (a.2) comprises creating the acoustic model selected from the group consisting of: context-independent model, context-dependent model, and triphone model.

12. The method of claim 1, wherein step (e) comprises computing further data selected from the group consisting of: anti-word match scores, mismatch phoneme percentage, match phoneme percentage, duration penalized probability, and a predetermined Confidence value.

13. The method of claim 12, wherein the predetermined Confidence value is chosen for each of the predetermined keywords so as to achieve a desired false alarm rate and accuracy.

14. A computerized method of speech recognition, in an automatic speech recognition system wherein said system comprises at least a speech recognition engine, for real-time spotting of predetermined keywords in an audio stream, comprising the steps of:

a) developing a keyword model for the predetermined keywords;

b) dividing, by the speech recognition engine, the audio stream into a series of points in an acoustic space that spans all possible sounds created in a particular language;

c) determining, by the speech recognition engine, a posterior probability that a first trajectory of each keyword model for the predetermined keywords in the acoustic space matches a second trajectory of a portion of the series of points in the acoustic space, wherein the posterior probability is determined utilizing the mathematical equation:

$$P(T_i \mid x) = \frac{P(x \mid T_i)}{\sum_k P(x \mid M_k)},$$

wherein where P represents a probability, $T_i$ represents a model, x represents the acoustics, and $M_k$ represents monophone models over an audio space;

d) comparing, by the speech recognition engine in real-time, the posterior probability to a predetermined threshold; and e) reporting a spotted keyword if the posterior probability is greater than the predetermined threshold, wherein the reporting comprises generating a report, via a microprocessor and software program, that is presented as a start and end time of the spotted keyword in the audio stream with the posterior probability that the keyword was found.

15. The method of claim 14, wherein the audio stream comprises a continuous spoken speech stream.

16. The method of claim 14, wherein the space comprises a 39-dimensional space.

17. The method of claim 14, wherein step (b) comprises:
b.1) converting the audio stream into a sequence of windows; and
b.2) calculating a set of 13 Mel Frequency Cepstrel Coefficients and their first and second order derivatives for each window.

18. The method of claim 14, wherein step (c) comprises executing a Viterbi algorithm.

19. The method of claim 14, wherein step (c) comprises:
c.1) assigning a constant predetermined probability to the portions of the audio stream that do not match the keyword.

20. The method of claim 14, wherein step (a) comprises concatenating phoneme hidden Markov models of predetermined keywords.

21. The method of claim 14, wherein step (e) comprises:
   e.1) declaring a potential spotted word if the posterior probability is greater than the predetermined threshold;
   e.2) computing further data to aid in determination of mismatches;
   e.3) using the further data to determine if the potential spotted word is a false alarm; and
   e.4) reporting spotted keyword if a false alarm is not identified at step (e.3).

22. The method of claim 21, wherein step (e.2) comprises computing further data selected from the group consisting of: anti-word match scores, mismatch phoneme percentage, match phoneme percentage, duration penalized probability, and a predetermined Confidence value.

23. The method of claim 22, wherein the predetermined Confidence value is chosen for each of the predetermined keywords so as to achieve a desired false alarm rate and accuracy.

24. The method of claim 14, wherein step (a) comprises:
   a.1) creating a pronunciation dictionary that defines a sequence of phonemes for each of the predetermined keywords;
   a.2) creating an acoustic model that statistically models a relation between textual properties of the phonemes for each of the predetermined keywords and spoken properties of the phonemes for each of the predetermined keywords; and
   a.3) concatenating acoustic models for the sequence of phonemes for each of the predetermined keywords.

25. The method of claim 24, wherein step (a.2) comprises creating a set of Gaussian mixture models.

26. The method of claim 25, wherein step (a.2) comprises creating the acoustic model selected from the group consisting of: context-independent model, context-dependent model, and triphone model.

* * * * *